US009512964B2

(12) United States Patent
Nakamura et al.

(10) Patent No.: US 9,512,964 B2
(45) Date of Patent: Dec. 6, 2016

(54) HIGH PRESSURE GAS CONTAINER AND MANUFACTURING METHOD FOR HIGH PRESSURE GAS CONTAINER

(75) Inventors: Yoshinari Nakamura, Sagamihara (JP); Takashi Kobayashi, Sagamihara (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/130,318

(22) PCT Filed: Jun. 29, 2012

(86) PCT No.: PCT/JP2012/066714
§ 371 (c)(1),
(2), (4) Date: Dec. 30, 2013

(87) PCT Pub. No.: WO2013/005676
PCT Pub. Date: Jan. 10, 2013

(65) Prior Publication Data
US 2014/0197179 A1    Jul. 17, 2014

(30) Foreign Application Priority Data

Jul. 1, 2011    (JP) .................................. 2011-147550

(51) Int. Cl.
F17C 1/02    (2006.01)
F17C 1/04    (2006.01)
(Continued)

(52) U.S. Cl.
CPC .................. *F17C 1/04* (2013.01); *B21D 51/24* (2013.01); *F17C 1/06* (2013.01);*F17C 2201/0109* (2013.01); *F17C 2201/056* (2013.01); *F17C 2203/0604* (2013.01); *F17C 2203/0646* (2013.01); *F17C 2203/0663* (2013.01); *F17C 2221/012* (2013.01); *F17C*
(Continued)

(58) Field of Classification Search
CPC ....... B65D 90/02; B65D 90/04; B65D 90/041; B65D 90/044; F17C 2203/0604
(Continued)

(56) References Cited

U.S. PATENT DOCUMENTS 4,225,051 A  *  9/1980  Faudou et al. ................ 220/590
4,964,524 A  *  10/1990  Halene .......................... 220/586
(Continued)

FOREIGN PATENT DOCUMENTS

CN    201715231 U    1/2011
DE    761221 C    5/1953
(Continued)

OTHER PUBLICATIONS

Translation of JP 2-91265, The McElroy Translation Co., Sep. 2014.*
(Continued)

*Primary Examiner* — Stephen Castellano
(74) *Attorney, Agent, or Firm* — Hauptman Ham, LLP

(57) ABSTRACT

This invention is a high pressure gas container into which a high pressure gas is charged, includes: a liner into which the high pressure gas is charged; and a reinforcing sleeve that envelops an outer surface of the liner, wherein the liner includes: a cylindrical liner trunk portion; and a pair of liner shoulder portions formed by reducing a diameter of respective end portions of the liner trunk portion, and the reinforcing sleeve includes: a sleeve trunk portion fitted to the liner trunk portion; and a pair of sleeve shoulder portions that extend from the sleeve trunk portion so as to contact the respective liner shoulder portions.

17 Claims, 2 Drawing Sheets

(51) Int. Cl.
  *F17C 1/06*       (2006.01)
  *B21D 51/24*      (2006.01)
(52) U.S. Cl.
  CPC ........... 2223/0123 (2013.01); *F17C 2223/035* (2013.01); *F17C 2223/036* (2013.01); *Y02E 60/321* (2013.01)
(58) Field of Classification Search
  USPC ....................................................... 220/586
  See application file for complete search history.

(56) References Cited

U.S. PATENT DOCUMENTS

| 2008/0142523 | A1 | 6/2008 | Sakaguchi et al. |
| 2011/0056960 | A1 | 3/2011 | Blanc et al. |

FOREIGN PATENT DOCUMENTS

| JP | 2-91265 U | 7/1990 |
| JP | 08-243851 A | 9/1996 |
| JP | 2005-337391 A | 12/2005 |
| JP | 2006-300140 A | 11/2006 |
| WO | 89/00658 A1 | 1/1989 |

OTHER PUBLICATIONS

ISR for PCT/JP2012/066714 mailed Oct. 2, 2012.
Office Action issued Jul. 3, 2014, corresponds to Chinese patent application No. 201280032491.7.
Extended European Search Report dated Sep. 28, 2015, corresponding to European patent application No. 12807160.2.

* cited by examiner

HIGH PRESSURE GAS CONTAINER AND MANUFACTURING METHOD FOR HIGH PRESSURE GAS CONTAINER

RELATED APPLICATIONS

The present application is National Phase of International Application Number PCT/JP2012/066714 filed Jun. 29, 2012 and claims priority to Japanese Application Number 2011-147550 filed Jul. 1, 2011.

TECHNICAL FIELD

This invention relates to a high pressure gas container filled with a high pressure gas, and a method of manufacturing the high pressure gas container.

BACKGROUND ART

A high pressure gas container having a tank-shaped liner filled with a high pressure gas is in use conventionally. For example, JP2006-300140A and JP2005-337391A propose high pressure gas containers in which a reinforcing layer is formed by fixing reinforcing fiber wound around an outer peripheral surface of the liner using resin in order to improve a pressure resistance, which constitutes a mechanical strength of the high pressure gas container.

SUMMARY OF INVENTION

However, in a conventional high pressure gas container such as those disclosed in JP2006-300140A and JP2005-337391A, the reinforcing layer is formed by winding reinforcing fiber around the outer peripheral surface of the liner, and therefore reinforcing fiber wound around dome-shaped liner shoulder portions provided on respective end portions of the liner is weaker than reinforcing fiber wound around a liner trunk portion. Hence, it is difficult to secure mechanical strength in the liner shoulder portions.

Further, the reinforcing layer is formed by winding the reinforcing fiber around the peripheral surface of the liner in numerous layers. A process for forming the reinforcing layer is therefore time-consuming, making mass production difficult.

This invention has been designed in consideration of the problems described above, and an object thereof is to provide a high pressure gas container in which pressure resistance is secured, and a manufacturing method for the high pressure gas container with which mass production is possible.

According to one aspect of this invention, a high pressure gas container that is configured to be charged with a high pressure gas thereinto is provided. The high pressure gas container includes: a liner that is configured to be charged with the high pressure gas thereinto; and a reinforcing sleeve that envelops an outer surface of the liner. The liner includes: a cylindrical liner trunk portion; and a pair of liner shoulder portions formed by reducing a diameter of respective end portions of the liner trunk portion. The reinforcing sleeve includes: a sleeve trunk portion fitted to the liner trunk portion; and a pair of sleeve shoulder portions that extend from the sleeve trunk portion so as to contact the respective liner shoulder portions.

The details as well as other features and advantages of this invention are set forth in the remainder of the specification and are shown in the accompanying drawings.

DESCRIPTION OF EMBODIMENTS

An embodiment of this invention will be described below with reference to the figures.

Figure 1:
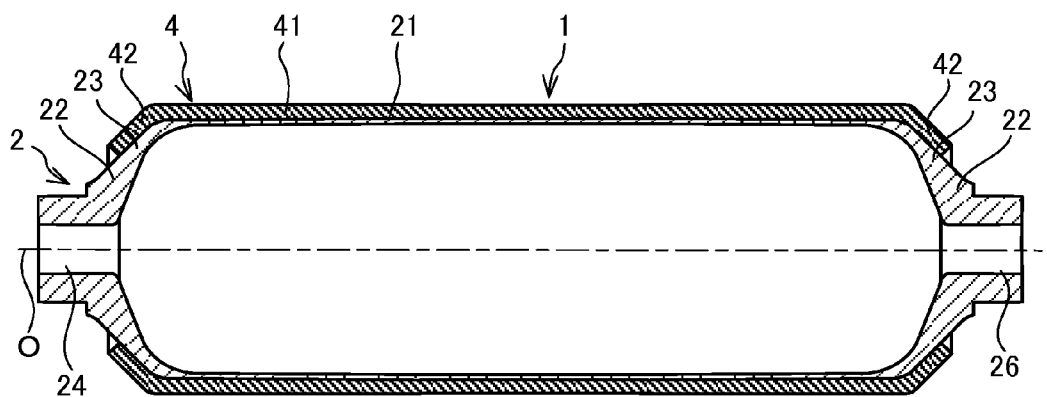
FIG. 1 is a sectional view of a high pressure gas container according to an embodiment of this invention.

First, referring to FIGS. 1 and 2, a configuration of a high pressure gas container 1 according to this embodiment of this invention will be described. The high pressure gas container 1 is installed in a vehicle that uses hydrogen gas as a fuel, for example, in order to store high pressure hydrogen gas.

The hydrogen storage container 1 includes a liner 2 serving as a hollow main tank into which the high pressure hydrogen gas is charged, a hollow sub-tank, not shown in the figures, provided inside the liner 2, a hydrogen storage material housed inside the sub-tank, and a heat exchanger that cools and heats the hydrogen storage material. The high pressure gas container 1 is a hybrid type container including both the liner 2 and the sub-tank.

A powdered hydrogen storage alloy, for example, is used as the hydrogen storage material housed inside the sub-tank. The hydrogen storage alloy is an alloy capable of storing at least several hundred times the amount of hydrogen gas that can be stored in the atmosphere.

To charge hydrogen gas into the high pressure gas container 1, the high pressure hydrogen gas is supplied into the liner 2, and a heat exchange medium is supplied to the heat exchanger as a low temperature cooling medium in order to cool the hydrogen storage material in the sub-tank. In so doing, storage of the hydrogen gas in the hydrogen storage material is promoted.

To extract the hydrogen gas from the high pressure gas container 1, on the other hand, a high temperature heat exchange medium is supplied to the heat exchanger in order to heat the hydrogen storage material in the sub-tank. In so doing, discharge of the hydrogen gas from the hydrogen storage material is promoted.

The high pressure gas container 1 includes the hollow liner 2 filled with the high pressure hydrogen gas, and a reinforcing sleeve 4 enveloping an outer peripheral surface of the liner 2. The liner 2 and the reinforcing sleeve 4, when seen on FIG. 1, are formed to be substantially symmetrical about a center line O of the high pressure gas container 1.

The liner 2 includes a cylindrical liner trunk portion 21, and liner end portions 22 formed by throttling respective end portions of the liner trunk portion 21 into dome shapes. The liner end portions 22 on the respective ends are formed integrally with the liner trunk portion 21.

It should be noted that this invention is not limited thereto, and instead, the liner end portion on one end may be formed integrally with the liner trunk portion while the liner end portion on the other end is formed separately from the liner trunk portion as a tank lid. Further, the liner end portions on the respective ends may both be formed separately from the liner trunk portion.

The liner end portions 22 respectively include liner shoulder portions 23 formed by reducing a diameter of the respective end portions of the cylindrical liner trunk portion 21 into dome shapes, and liner opening portions 24 that open in respective central portions of the liner shoulder portions 23.

Although not shown in the figures, a passage through which the hydrogen gas passes and a passage through which the heat exchange medium passes are provided respectively in the liner opening portions 24, whereupon the liner opening portions 24 are closed.

The liner 2 is formed from an aluminum alloy, for example. In so doing, the liner 2 is prevented from becoming brittle even when an inner surface thereof is exposed to the hydrogen gas, and as a result, corrosion resistance is secured.

The reinforcing sleeve 4 is formed from high tensile steel, for example, as a metal having higher tensile strength and a smaller thermal expansion coefficient than the liner 2.

A seamless drawn tube, which is a seamless pipe having a ring-shaped cross-section, is used as the reinforcing sleeve 4, for example.

The reinforcing sleeve 4 includes a cylindrical sleeve trunk portion 41 that is fitted to an outer peripheral surface of the liner trunk portion 21, and a pair of sleeve shoulder portions 42 that extend from respective end portions of the sleeve trunk portion 41 so as to contact the respective liner shoulder portions 23.

Figure 2:
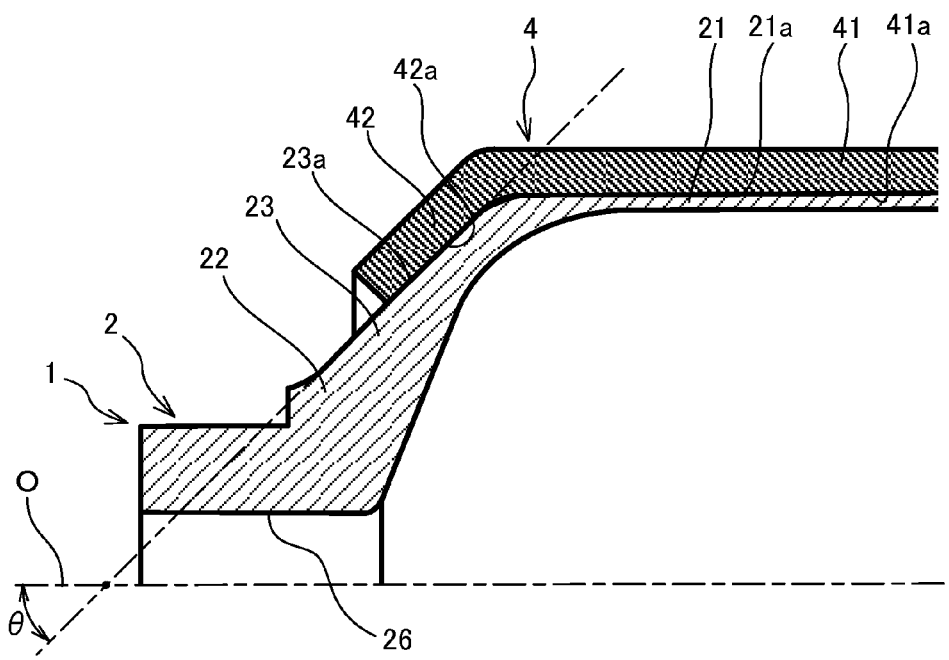
FIG. 2 is a partially enlarged sectional view of the high pressure gas container according to this embodiment of this invention.

FIG. 2 is an enlarged sectional view showing a vicinity of the liner shoulder portion 23 of the high pressure gas container 1.

As shown in FIG. 2, the liner shoulder portion 23 is formed in a tapered shape. An outer surface 23a of the liner shoulder portion 23 constitutes a side face of the tapered shape. An incline angle θ of the outer surface 23a relative to the center line O is set as desired in accordance with a required mechanical strength of the liner shoulder portion 23.

The sleeve shoulder portion 42 is formed in a tapered shape in alignment with the outer surface 23a of the liner shoulder portion 23. An inner surface 42a of the sleeve shoulder portion 42 is in surface contact with the outer surface 23a of the liner shoulder portion 23.

When hydrogen gas is charged into the high pressure gas container 1, an internal pressure of the liner 2 increases such that the liner 2 attempts to expand. However, expansion of the liner 2 is suppressed by the reinforcing sleeve 4 enveloping the liner 2, and therefore tensile stress in the liner 2 is reduced.

More specifically, by enveloping the liner 2 in the sleeve trunk portion 41 of the reinforcing sleeve 4 fitted to the outer peripheral surface of the liner trunk portion 21, expansion in a radial direction orthogonal to the center line O is suppressed. As a result, internal stress generated in the liner trunk portion 21 in the radial direction is reduced.

Further, by having the sleeve shoulder portion 42 of the reinforcing sleeve 4 contact the outer surface 23a of the liner shoulder portion 23, expansion in an axial direction extending along the center line O is suppressed. As a result, internal stress generated in the liner shoulder portion 23 and the liner trunk portion 21 in the axial direction is reduced.

The outer surface 23a of the liner shoulder portion 23 contacts the inner surface 42a of the sleeve shoulder portion 42 in a tapered shape. Therefore, when the liner 2 attempts to expand, the sleeve shoulder portion 42, which has been plastically deformed to align with the outer surface 23a, is pressed against the outer surface 23a of the liner shoulder portion 23 by an elastic restoration force thereof. As a result, stress generated in a connecting portion serving as a boundary between the dome-shaped liner shoulder portion 23 and the cylindrical liner trunk portion 21 is reduced.

Next, referring to FIGS. 3A and 3B, a method of manufacturing the high pressure gas container 1 will be described.

The high pressure gas container 1 is manufactured by performing, in sequence, a fitting process for fitting the reinforcing sleeve 4 to the liner 2, and a forming process for forming the sleeve shoulder portions 42 by forming the reinforcing sleeve 4 to throttle the respective end portions thereof.

Figure 3A:
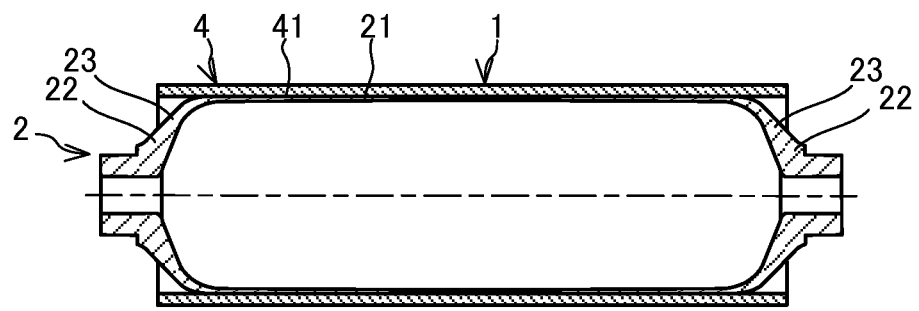
FIG. 3A is a schematic sectional view showing a fitting process of a high pressure gas container manufacturing method according to this embodiment of this invention.

In the fitting process shown in FIG. 3A, the reinforcing sleeve 4 formed in a straight cylinder shape is fitted to the outer periphery of the liner 2 by press-fitting, for example. As a result, an inner surface 41a of the sleeve trunk portion 41 contacts an outer surface 21a of the liner trunk portion 21 without gaps.

Figure 3B:
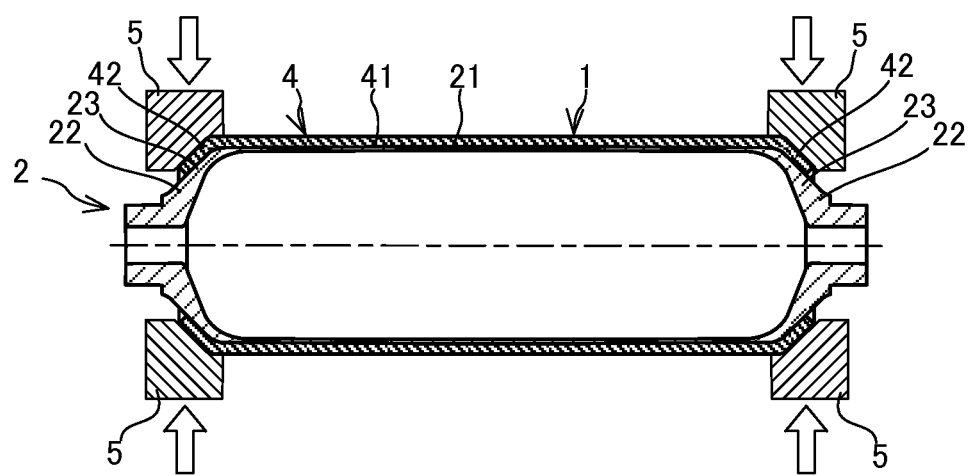
FIG. 3B is a schematic sectional view showing a forming process of the high pressure gas container manufacturing method according to this embodiment of this invention.

In the forming process shown in FIG. 3B, the straight cylinder-shaped reinforcing sleeve 4 fitted to the liner 2 is formed to throttle the respective end portions thereof. As a result, the tapered sleeve shoulder portions 42 are formed in the respective end portions of the reinforcing sleeve 4.

The forming process is performed by implementing a pressing process constituting a cold forming process in which a plurality of press dies 5 are pressed against the respective end portions of the reinforcing sleeve 4 from the radial direction of the reinforcing sleeve 4. It should be noted that this invention is not limited thereto, and the forming process may be performed by implementing a pressing process in which press dies are pressed against the respective end portions of the reinforcing sleeve 4 from the axial direction of the reinforcing sleeve 4.

Further, in the forming process, an incline angle of the inner surface 42a of the sleeve shoulder portion 42 relative to the center line O is preferably set to be larger than the incline angle θ of the outer surface 23a of the liner shoulder portion 23 relative to the center line O.

In this case, the sleeve shoulder portion 42 is pressed fixedly against the liner shoulder portion 23 by the elastic restoration force that causes the liner shoulder portion 23 to attempt to return to its original shape following the forming process. Accordingly, the sleeve shoulder portion 42 contacts the liner shoulder portion 23 over a wide range without gaps. As a result, sufficient surface pressure is secured between a tip end portion of the sleeve shoulder portion 42 and the liner shoulder portion 23.

Furthermore, the sleeve shoulder portion 42 is work-hardened by the pressing process implemented during the forming process to compress the sleeve shoulder portion 42 between the press dies 5 and the liner shoulder portion 23, and as a result, sufficient strength is secured therein.

To further improve adhesion between the reinforcing sleeve 4 and the liner 2, the liner 2 may be subjected to plastic deformation after the forming process in order to expand the liner 2 by applying pressure to the interior of the liner 2.

The method of manufacturing the high pressure gas container 1 is not limited to the manufacturing method described above, and in an alternative manufacturing method, the sleeve shoulder portion 42 may be formed in advance on one end of the reinforcing sleeve 4. A fitting process is then performed to fit the reinforcing sleeve 4 to the liner 2 so that the sleeve shoulder portion 42 contacts the liner shoulder portion 23, whereupon a forming process is performed to mold the sleeve shoulder portion 42 to the other end of the reinforcing sleeve 4.

Further, the inner surfaces 42a of the sleeve shoulder portions 42 and the outer surfaces 23a of the liner shoulder portions 23 contact each other over substantially an entire region, but this invention is not limited to this configuration, and instead, only the tip end portion of the sleeve shoulder portion 42 may contact the liner shoulder portion 23 such that an annular interval is opened between a base end portion of the sleeve shoulder portion 42 and the liner shoulder portion 23.

According to the embodiment described above, following actions and effects are obtained.

The hydrogen storage container 1 includes the liner 2 into which the high pressure gas is charged, and the reinforcing sleeve 4 enveloping the outer peripheral surface of the liner 2. The liner 2 includes the cylindrical liner trunk portion 21, and the liner shoulder portions 23 formed by reducing the diameter of the respective end portions of the liner trunk portion 21. The reinforcing sleeve 4 includes the sleeve trunk portion 41 fitted to the liner trunk portion 21, and the sleeve shoulder portions 42 that extend from the sleeve trunk portion 41 so as to contact the liner shoulder portions 23.

Hence, in the high pressure gas container 1, the reinforcing sleeve 4 envelops the outer surfaces of the liner trunk portion 21 and the liner shoulder portions 23 of the liner 2. Therefore, when high pressure gas is charged into the high pressure gas container 1, expansion of the liner 2 in the radial direction and the axial direction is suppressed by the reinforcing sleeve 4. As a result, stress generated in the liner shoulder portions 23 extending in a dome shape from the liner trunk portion 21 is reduced, whereby pressure resistance is secured in the high pressure gas container 1.

Further, in the high pressure gas container 1, the reinforcing sleeve 4 is formed from a metal having higher tensile strength than the liner 2.

Therefore, when high pressure gas is charged into the high pressure gas container 1, the reinforcing sleeve 4 having high tensile strength suppresses expansion of the liner 2. As a result, the pressure resistance of the high pressure gas container 1 is improved.

Furthermore, in the high pressure gas container 1, the reinforcing sleeve 4 is formed from a metal having a smaller thermal expansion coefficient than the liner 2.

Therefore, when high pressure gas is charged into the high pressure gas container 1, although respective temperatures of the liner 2 and the reinforcing sleeve 4 both increase, the reinforcing sleeve 4 having a smaller thermal expansion coefficient deforms by a smaller amount than the liner 2. Accordingly, the reinforcing sleeve 4 compresses the liner 2, leading to a further improvement in the pressure resistance of the high pressure gas container 1.

Moreover, in the high pressure gas container 1, the liner shoulder portion 23 includes the tapered outer surface 23a, while the sleeve shoulder portion 42 includes the tapered inner surface 42a that contacts the outer surface 23a of the liner shoulder portion 23.

As a result, the sleeve shoulder portion 42 is pressed against the outer surface 23a of the liner shoulder portion 23 such that stress generated in the dome-shaped liner shoulder portion 23 is reduced.

Further, the high pressure gas container 1 including the liner 2 into which the high pressure gas is charged and the reinforcing sleeve 4 enveloping the outer peripheral surface of the liner 2 is manufactured by performing, in sequence, the fitting process for fitting the reinforcing sleeve 4 to the cylindrical liner trunk portion 21 of the liner 2, and the forming process for forming the sleeve shoulder portions 42 contacting the liner shoulder portions 23, which are formed by throttling the respective end portions of the liner trunk portion 21, by forming the reinforcing sleeve 4 to throttle the respective end portions thereof.

By implementing the forming process to throttle the end portions of the reinforcing sleeve 4, the sleeve shoulder portions 42 are work-hardened, and therefore sufficient strength is secured therein.

Further, by forming the liner shoulder portions 23 in the forming process after fitting the reinforcing sleeve 4 to the liner 2, an amount of time required to attach the reinforcing sleeve 4 to the liner 2 can be reduced. As a result, the high pressure gas container 1 can be mass-produced, leading to a reduction in product cost.

Although the invention has been described above with reference to certain embodiments, the invention is not limited to the embodiments described above. Modifications and variations of the embodiments described above will occur to those skilled in the art, within the scope of the claims.

For example, this invention is not limited to hydrogen storage using a hydrogen storage alloy, and may also be applied to a tank, a cylinder, or the like into which another gas is charged.

This application claims priority based on Japanese Patent Application No. 2011-147550 filed with the Japan Patent Office on Jul. 1, 2011, the entire contents of which are incorporated into this specification.

The embodiments of this invention in which an exclusive property or privilege is claimed are defined as follows:

1. A high pressure gas container configured to be charged with a high pressure gas thereinto, the high pressure gas container comprising:
   a liner configured to be charged with the high pressure gas thereinto; and
   a reinforcing sleeve that envelops an outer surface of the liner, wherein
   the liner includes:
      a cylindrical liner trunk portion; and
      a pair of liner shoulder portions formed integrally with the liner trunk portion by reducing a diameter of respective end portions of the liner trunk portion,
   the reinforcing sleeve is made from a metal and includes:
      a sleeve trunk portion fitted to the liner trunk portion; and
      a pair of sleeve shoulder portions that extend from the sleeve trunk portion and contact the respective liner shoulder portions,
   in a forming process, an incline angle of an inner surface of each of the sleeve shoulder portions relative to a center line of the high pressure gas container is formed larger than an incline angle of an outer surface of the respective liner shoulder portion relative to the center line,
   the reinforcing sleeve is seamless, and
   the inner surface of the sleeve trunk portion contacts the outer surface of the liner trunk portion without gaps.

2. The high pressure gas container as defined in claim 1, wherein
   the reinforcing sleeve is formed from the metal having a higher tensile strength than the liner.

3. The high pressure gas container as defined in claim 1, wherein
   the reinforcing sleeve is formed from the metal having a smaller thermal expansion coefficient than the liner.

4. The high pressure gas container as defined in claim 1, wherein
the liner is formed from an aluminum alloy, and the reinforcing sleeve is formed from high tensile steel.

5. The high pressure gas container as defined in claim 1, wherein
each of the liner shoulder portions has a tapered outer surface, and the inner surface of the respective sleeve shoulder portion is a tapered inner surface that contacts the outer surface of the liner shoulder portion.

6. The high pressure gas container as defined in claim 1, wherein
the liner trunk portion and the liner shoulder portions comprise a same material, said material extending continuously from one of the liner shoulder portions to the liner trunk portion and then to the other liner shoulder portion.

7. The high pressure gas container as defined in claim 6, wherein
an inner surface of the reinforcing sleeve is in surface contact with said material on an outer surface of the liner, said surface contact extending continuously from the liner trunk portion to each of the liner shoulder portions.

8. The high pressure gas container as defined in claim 7, wherein
an inner diameter of each of the liner shoulder portions is reduced along a surface of said material in the liner shoulder portion, said surface of said material extending continuously from the liner trunk portion to each of the liner shoulder portions.

9. A high pressure gas container configured to be charged with a high pressure gas thereinto, the high pressure gas container comprising:
a liner configured to be charged with the high pressure gas thereinto; and
a reinforcing sleeve that envelops the liner, wherein
the liner includes:
a cylindrical liner trunk portion; and
a pair of liner shoulder portions formed integrally with the liner trunk portion by reducing a diameter of respective end portions of the liner trunk portion,
the reinforcing sleeve is made from a metal and includes:
a sleeve trunk portion fitted to the liner trunk portion; and
a pair of sleeve shoulder portions that extend from the sleeve trunk portion and contact the respective liner shoulder portions,
the reinforcing sleeve is seamless, and
an inner surface of the sleeve trunk portion contacts an outer surface of the liner trunk portion without gaps.

10. The high pressure gas container as defined in claim 9, wherein
the liner has two openings opposed to each other along a center line of the high pressure gas container, and each of the liner shoulder portions extends around a corresponding one of said two openings.

11. The high pressure gas container as defined in claim 10, wherein
the metal has a higher tensile strength than the liner, and the metal has a smaller thermal expansion coefficient than the liner.

12. The high pressure gas container as defined in claim 10, wherein
the liner is formed from an aluminum alloy, and the reinforcing sleeve is formed from high tensile steel.

13. The high pressure gas container as defined in claim 11, wherein
each of the liner shoulder portions has a tapered outer surface, and an inner surface of the respective sleeve shoulder portion is a tapered inner surface that contacts the outer surface of the liner shoulder portion.

14. The high pressure gas container as defined in claim 13, wherein
the liner trunk portion and the liner shoulder portions comprise a same material, said material extending continuously from one of the liner shoulder portions to the liner trunk portion and then to the other liner shoulder portion.

15. The high pressure gas container as defined in claim 14, wherein
an inner surface of the reinforcing sleeve is in surface contact with said material on an outer surface of the liner, said surface contact extending continuously from the liner trunk portion to each of the liner shoulder portions.

16. The high pressure gas container as defined in claim 15, wherein
an inner diameter of each of the liner shoulder portions is reduced along a surface of said material in the liner shoulder portion, said surface of said material extending continuously from the liner trunk portion to each of the liner shoulder portions.

17. A manufacturing method for a high pressure gas container configured to be charged with a high pressure gas thereinto,
the high pressure gas container having
a liner configured to be charged with the high pressure gas thereinto, and
a reinforcing sleeve that envelops an outer surface of the liner,
the manufacturing method comprising:
providing the liner, wherein the liner includes:
a cylindrical liner trunk portion; and
a pair of liner shoulder portions formed integrally with the liner trunk portion by reducing a diameter of respective end portions of the liner trunk portion,
forming the reinforcing sleeve from a metal, wherein the reinforcing sleeve is seamless;
a fitting process of fitting a sleeve trunk portion of the reinforcing sleeve to the cylindrical liner trunk portion of the liner, wherein the inner surface of the sleeve trunk portion contacts the outer surface of the liner trunk portion without gaps; and
a forming process of throttling respective end portions of the reinforcing sleeve to form a pair of sleeve shoulder portions that extend from the sleeve trunk portion and contact the respective liner shoulder portions, wherein
in the forming process, an incline angle of an inner surface of each of the sleeve shoulder portions relative to a center line of the high pressure gas container is formed larger than an incline angle of an outer surface of the respective liner shoulder portion relative to the center line.

* * * * *